United States Patent
Yilmaz et al.

(10) Patent No.: US 9,544,835 B2
(45) Date of Patent: Jan. 10, 2017

(54) METHOD AND APPARATUS FOR CONNECTION MANAGEMENT

(75) Inventors: Osman Yilmaz, Helsinki (FI); Jari Lunden, Espoo (FI); Carl Wijting, Espoo (FI); Athul Prasad, Espoo (FI)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 14/366,688

(22) PCT Filed: Dec. 22, 2011

(86) PCT No.: PCT/FI2011/051149
§ 371 (c)(1),
(2), (4) Date: Jun. 19, 2014

(87) PCT Pub. No.: WO2013/093174
PCT Pub. Date: Jun. 27, 2013

(65) Prior Publication Data
US 2015/0004971 A1    Jan. 1, 2015

(51) Int. Cl.
*H04W 4/00* (2009.01)
*H04W 48/16* (2009.01)
*H04W 36/00* (2009.01)
*H04W 28/06* (2009.01)
*H04W 48/20* (2009.01)
*H04W 88/06* (2009.01)
*H04W 84/04* (2009.01)
(Continued)

(52) U.S. Cl.
CPC ............ *H04W 48/16* (2013.01); *H04W 28/06* (2013.01); *H04W 36/0083* (2013.01); *H04W 48/20* (2013.01); *H04W 8/005* (2013.01); *H04W 36/04* (2013.01); *H04W 84/045* (2013.01); *H04W 88/06* (2013.01)

(58) Field of Classification Search
CPC .. H04W 48/16; H04W 28/06; H04W 36/0083; H04W 48/20; H04W 8/005; H04W 36/04; H04W 84/045; H04W 88/06
USPC ......................................................... 455/434
See application file for complete search history.

(56) References Cited

U.S. PATENT DOCUMENTS

| 2010/0035601 A1 | 2/2010 | Chen et al. |
| 2010/0172267 A1 | 7/2010 | Viorel et al. |
| 2010/0323633 A1 | 12/2010 | Pani et al. |

(Continued)

FOREIGN PATENT DOCUMENTS

WO    WO9903290 A1    1/1999

OTHER PUBLICATIONS

Doppler, Klaus et al. "On efficient discovery of next generation local area networks". In: WCNC, p. 269-274, 2001.

*Primary Examiner* — Amancio Gonzalez
(74) *Attorney, Agent, or Firm* — Seppo Laine Oy (57) ABSTRACT

In accordance with an example embodiment of the present invention, there is provided a method comprising maintaining attachment of an apparatus to a macro cell, directing searching for, or scanning for, small cells during attachment of the apparatus to the macro cell. Responsive to detecting a first small cell with a received signal characteristic exceeding a predetermined first threshold, the method comprises causing searching for further small cells other than the first small cell to be interrupted, wherein the apparatus is configured to communicate with and attach to cells comprised in a heterogeneous network, and the macro cell, the first small cell and the further small cells are heterogeneous network cells.

14 Claims, 4 Drawing Sheets

(51) Int. Cl.
*H04W 8/00* (2009.01)
*H04W 36/04* (2009.01)

(56) References Cited

U.S. PATENT DOCUMENTS

2013/0040640 A1* 2/2013 Chen .................. H04W 36/30
455/434

* cited by examiner

METHOD AND APPARATUS FOR CONNECTION MANAGEMENT

TECHNICAL FIELD

The present application relates generally to connection or attachment management in wireless communication networks comprising different cells.

BACKGROUND

Wireless mobile communication devices may be configured to maintain connectivity to a wireless network while they move, or are moved, in a coverage area of a wireless network. Connectivity may be maintained to cells comprised in the wireless network, each cell corresponding roughly to a certain cell coverage area.

As the wireless device moves, or roams, in the coverage area it may seek to remain connected to an optimal cell at each time. As the wireless device moves, the optimal cell can change as the wireless device moves from one cell coverage area to the next. In order to discover the optimal cell, the wireless device may conduct measurements of signal strengths transmitted by cell beacons or reference signals broadcasted by the cell, for example. When the wireless device discovers that a strength of a received signal associated with a cell the wireless device is attached to becomes weaker than that of a signal associated with another cell, the wireless device may be configured to report this to the wireless network to trigger handover to the cell with the stronger signal.

In some deployments, wireless networks comprise different types of cells. For example, large cells, known also as macro cells, may be used to serve highly mobile users and provide large-area coverage with a smaller number of cells. Similarly, small cells may be used to provide improved coverage or higher capacity to certain areas, more limited in size, where communication is frequently needed.

Femtocells, or in general small cells, may be deployed for various reasons. Smaller cells in general have been used to increase network capacity by allowing frequencies to be re-used to a higher degree over a given geographic area. A large cell allows for a set of frequencies to be used only once, which limits capacity. By splitting a large cell into smaller ones that may operate with a lower transmit power, the same set of frequencies may be used more than once, allowing a network operator to serve a larger number of subscribers in the same area and by using the same frequency band. Other names for small cells include picocells which may be seen as larger than femtocells, and microcells which in turn may be seen as larger than picocells.

Small cells may also be used where transmission power limits don't allow installing a cell of larger radius. This is due to the fact that a base station serving a large cell must transmit to the edge of the large cell, which is further away than an edge of a smaller cell.

Another reason for using small cells is to allow a limited subset of subscribers to access an alternative cell, which may be comprised in a larger network, the larger network being open to a larger set of subscribers. Such a cell may be known as a closed subscriber group, CSG, cell. To define a CSG cell, a corresponding set of subscribers that have access to the cell may be defined. A CSG cell may be considered to be a special type of femto-pico- or microcell, for example. Alternatively access to a small cell may be open and traffic may be directed to the small cell based on a type of the traffic, for example.

In heterogeneous network deployment, macro cells and small cells may be deployed on different frequencies, even where they form part of the same operator's network. Macro cells may form an area of continuous coverage on one or more frequencies, or carriers, and small cells may provide local enhancements to capacity and/or coverage of the network on one or more other frequencies at certain areas. Thus, there may be no interference between macro cells and small cells due to frequency separation. In this case interference coordination is not necessary between macro cells and small cells and mobiles don't always need to connect to a strongest available cell to avoid interference.

SUMMARY

Various aspects of examples of the invention are set out in the claims.

According to a first aspect of the present invention, there is provided an apparatus, comprising a transceiver configured to maintain attachment of the apparatus to a macro cell, at least one processing core configured to direct searching for small cells during attachment of the apparatus to the macro cell, the at least one processing core being configured to, responsive to detecting a first small cell with a received signal characteristic exceeding a predetermined first threshold, cause searching for further small cells other than the first small cell to be interrupted, wherein the apparatus is configured to communicate with and attach to cells comprised in a heterogeneous network, and the macro cell, the first small cell and the further small cells are heterogeneous network cells.

According to a second aspect of the present invention, there is provided a method, comprising maintaining attachment of an apparatus to a macro cell, directing searching for small cells during attachment of the apparatus to the macro cell, responsive to detecting a first small cell with a received signal characteristic exceeding a predetermined first threshold, causing searching for further small cells other than the first small cell to be interrupted, wherein the apparatus is configured to communicate with and attach to cells comprised in a heterogeneous network, and the macro cell, the first small cell and the further small cells are heterogeneous network cells.

According to a third aspect of the present invention, there is provided a non-transitory computer-readable medium encoded with instructions that, when executed by a computer, perform maintaining attachment of an apparatus to a macro cell, directing searching for small cells during attachment of the apparatus to the macro cell, responsive to detecting a first small cell with a received signal characteristic exceeding a predetermined first threshold, causing searching for further small cells other than the first small cell to be interrupted, wherein the apparatus is configured to communicate with and attach to cells comprised in a heterogeneous network, and the macro cell, the first small cell and the further small cells are heterogeneous network cells.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
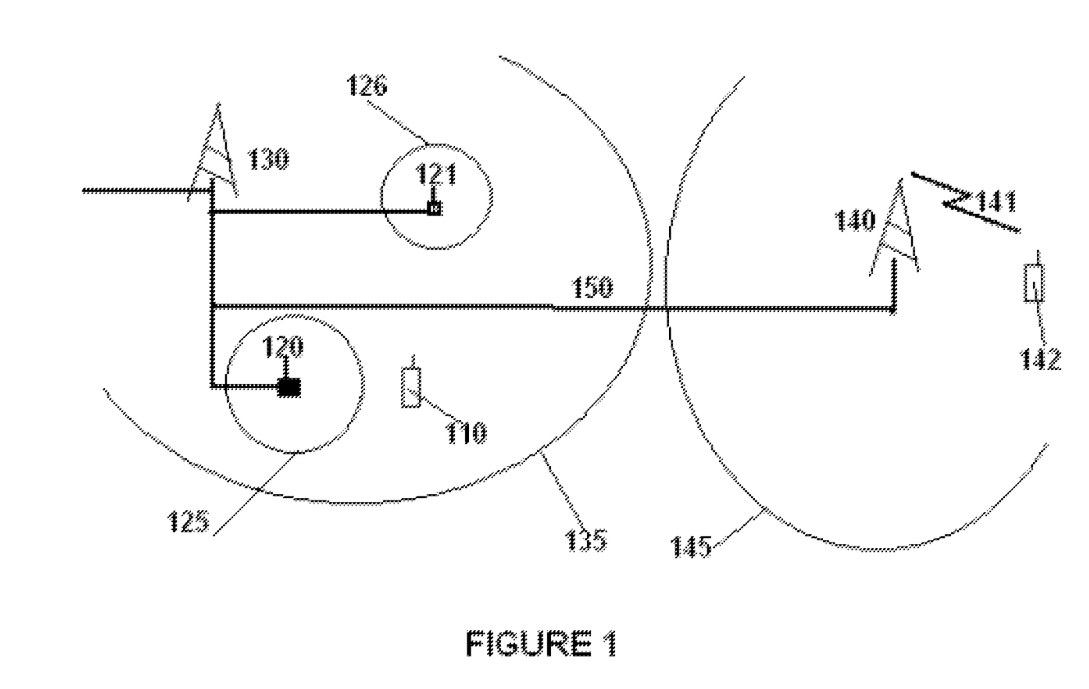
FIG. 1 illustrates an example system capable of supporting at least some embodiments of the invention.

FIG. 1 illustrates an example system capable of supporting at least some embodiments of the invention. The system comprises mobile 110, which may be a cellular telephone, personal digital assistant, PDA, cellular telephone, tablet computer or another kind of device, for example. Base stations 130 and 140 may be configured to operate according to at least one cellular standard, such as global system for mobile communication, GSM, wideband code division multiple access, WCDMA or long term evolution, LTE, for example. Base station 120 may be considered to control a cell of its own. Base stations 130 and 140 may be configured to communicate using a pre-defined band of licensed spectrum, which has been allocated by authorities for cellular communication. Base station 120 may operate according to wireless local area network, WLAN, or worldwide interoperability for microwave access, WiMAX, technologies, for example, or according to a cellular standard like cells 135 and 145, which are controlled by base stations 130 and 140, respectively. Base station 120 may be configured to control a small cell 125. Small cell 125 may be considered to be a smaller cell when compared to cells 135 and 145. Small cell 125 may operate using the same technology as cells 135 and 145, and small cell 125 may be comprised in the same network as cells 135 and 145. Base station 121 may be configured to control a further small cell 126. In some embodiments, base stations 120 and 121 are mobile devices.

Mobiles may roam from location to location, and depending on measurements of signal strength between mobile and base station, mobiles may change from communicating with a first base station, such as base station 130, to communicating with another base station, such as base station 140. Such a change may be known as a handover or handoff. In one form of handover, known as soft handover, a mobile may change from communicating with base station 130 only to communicating with base station 130 and base station 140, for example. A set of base stations with which a mobile communicates simultaneously may be known as an active set.

Small cell 125 may be configured to provide additional coverage for a subset of users, such as premium users or emergency services users. Small cell 125 may be configured to provide services that are not available in other cells, such as cells 135 and 145. Small cell 125 may provide a location estimate to users allowed to attach to it since small cell 125 may be a relatively small cell. Calls and connections from small cell 125 may be given preferential access to taxi centres, service numbers and/or intranet/extranet services, for example. In some embodiments small cell 125 is open to all users, and the network in which it and cell 135 are comprised in may be configured to offload certain types of traffic from cell 135 to small cell 125 for users in the cell coverage area of small cell 125. Similar considerations may apply to further small cell 126. A mobile may be capable of determining that a cell is a small cell based on, for example, the radio access technology used, broadcast information from the cell indicating its size or type, indication from the network that a certain cell IDs, or ranges of cell IDs, are small cells, or an indication that a certain carrier has small cells.

Network design and optimization aim to facilitate handovers between cells so that they rarely fail. It may nonetheless occur that a handover fails. A handover to a small cell may be more difficult to conclude successfully, for example, since a mobile that moves fast may exit the coverage area or enter an area of faded signal within the cell. Furthermore, if the small cell is on another frequency, inter-frequency measurements are needed for detection and subsequent measurements. This may cause additional delay if inter-frequency measurements are performed less frequently than intra-frequency measurements. Other possible causes for handover failure include errors in handover timing, radio channel fluctuation and access rights denial. Therefore networks with heterogeneous cells, such as networks comprising a mix of larger and smaller cells, may benefit from optimized handover procedures.

Mobile 110 may be capable of communicating with at least one cellular protocol used by base stations 120, 121, 130 and/or 140. FIG. 1 illustrates further mobile 142 in wireless communication with base station 140. Wireless link 141 interconnects further mobile 142 and base station 140. Wireless link 141 may comprise a downlink for conveying information from base station 140 to further mobile 142. Wireless link 141 may comprise an uplink for conveying information from further mobile 142 to base station 140. Wireless link 141 may conform to a cellular communication standard, for example. Wireless link 141 may be based on GSM, WCDMA, LTE or another standard. Wireless link 141 may be based on orthogonal frequency division multiple access, OFDMA, code division multiple access, CDMA, time divisions multiple access, TDMA, or a combination of these, for example. Wireless links between mobiles and base stations 130, 120 and 121 may be substantially similar to wireless link 141. Alternatively a network comprising base stations 120, 121, 130 and 140 may be multi-standard in the sense that base stations comprised therein do not all conform to the same radio access technology, RAT.

Base stations 120, 121, 130 and 140 are in the example system of FIG. 1 interconnected by a backbone network 150. In this example, backbone network 150 is further connected to other parts of the cellular network in which base stations 120, 121, 130 and 140 are comprised. The cellular network, or more generally the network, may comprise in addition to base stations various nodes such as switches, mobility management entities, MMEs, serving gateways, SGWs, base station controllers and the like, depending on the embodiment and type of network.

When mobile 110 roams within the coverage area of the network, a handover may be triggered, for example responsive to measurement results sent to the network by mobile 110. From these measurement results the network may be capable of determining, for example, that mobile 110 is moving toward a cell edge. The measurements may comprise mobile 110 measuring received power from channels or reference signals broadcast by base stations. A base station currently serving mobile 110, known as a source base station, may conduct preparations for a handover of mobile 110 to a new cell, known as the target cell. The preparations may comprise selecting an optimal target cell and causing a target base station to receive information on mobile 110. The target cell is controlled by the target base station, which may control also cells other than the target cell. The source base station can transmit information on mobile 110 directly to the target base station, or alternatively or additionally the source base station may send a signal to a further network element to cause the further network element to transmit information on mobile 110 to the target base station. The source and target base stations may communicate via backbone network 150, for example.

Information concerning mobile 110 that is sent to the target base station may be known as a context of mobile 110. The context may comprise history information on cells mobile 110 has been attached to previously, possibly including cells from more than one network and radio access technology. The context may alternatively or further comprise at least some of information on active radio bearers, capability information of mobile 110, and a radio resource configuration of mobile 110, for example.

A mobile 110 attached to cell 135, for example, may be configured to try to discover small cells while remaining attached to cell 135. Mobile 110 may be configured, for example, to continually update a list of small cells, such as cell 120 and cell 121, which are reachable from mobile 110. In some embodiments, when mobile 110 has discovered at least one small cell within reach, and mobile 110 determines that it is an endpoint for a communication of a type configured for offloading to a small cell, mobile 110 or the network may be configured to initiate handover of mobile 110 to the small cell. For example, where mobile 110 requests a download of a large file from the network, the download may be configured for offloading to a small cell which may trigger the handover of mobile 110 to the small cell. Another example of a communication type that may be configured for offloading to small cells is web browsing.

Mobile 110 may try to discover small cells by searching for them. Searching may comprise measuring signals transmitted by small cells and determining at least one signal characteristic of any received signals, a process also known as scanning. The signals transmitted by small cells may be broadcast signals, for example synchronization signals, or reference signals. A base station may be configured to provide to mobile 110 searching opportunities known as measurement gaps. The searching opportunities may be allocated to mobile 110 by a base station using downlink signaling. During a measurement gap, radio communication between mobile 110 and a base station mobile 110 is attached to may be paused, to give mobile 110 time to measure for energy on other radio resources, wherein the other radio resources are not in use between mobile 110 and the base station. Radio resources may be defined in terms of frequency bands, timeslots and spreading codes, for example. When the measurement gap ends, communication resumes between mobile 110 and the base station mobile 110 is attached to.

Searching for small cells operating on a different frequency than the serving macro cell may affect the continuity of mobile-base station communications since measurement gaps are introduced. Searching also consumes battery power in mobiles since operating a radio transceiver comprised in a mobile requires energy, and likewise analyzing measurement results in a processor comprised in a mobile requires energy. Further, since a mobile with a single receiver may not be able to receive signals from a serving macro base station operating on a different frequency than the one being measured during the measurement gaps, overall achievable peak data rate as well as scheduling flexibility of the base station may be affected, compared to a situation where communications are uninterrupted.

In some embodiments mobile 110 is capable of searching for small cells without interrupting communications with the base station to which mobile 110 is attached. This may be, for example, where small cells operate in accordance with a WLAN technology and the base station-mobile communication also operates in accordance with WCDMA technology. Also in these embodiments searching may be associated with consumption of battery power.

According to some embodiments of the invention, mobile 110 may be configured with a threshold level to determine a small cell signal level that is sufficient for communication. Mobile 110 may be configured to store the threshold in an internal memory. When, while searching for small cells, mobile 110 discovers a signal from a small cell, the discovered signal being stronger than the threshold level, mobile 110 may be configured to interrupt searching for further small cells. In other words, when mobile 110 discovers a small cell that is usable when judged based on a threshold, mobile 110 may interrupt or otherwise modify its search for small cells. Thereafter, if mobile 110 needs a small cell, it can use the discovered small cell with a strong signal exceeding the threshold, and additional searching might bring only limited benefits. When interrupting or otherwise modifying its search for small cells, mobile 110 may be configured at least one of to act autonomously, to inform the network or to inform the network and responsively receive a new allocation of measurement gaps from the network. When the network is informed, the network can plan radio resource utilization with the knowledge of the fact that mobile 110 won't use at least part of the measurement gaps allocated to mobile 110.

Mobile 110 may be configured to observe how the signal strength of the discovered small cell develops over time, and responsive to the received signal strength declining below a second threshold, mobile 110 may be configured to resume searching for small cells, for example at other carrier frequencies. In some embodiments, responsive to the received signal strength not exceeding the first threshold for a predetermined time interval, while the received signal strength is still above the second threshold, mobile 110 may be configured to resume searching for small cells, for example at other carrier frequencies. A decline in measured received signal strength may be due to mobile 110 moving further away from the discovered small cell or an increased interference level, for example. When resuming searching for small cells, mobile 110 may be configured to request measurement gaps to be assigned to it from the network.

In some embodiments, instead of interrupting entirely its search for small cells, mobile 110 is configured to decrease the frequency of attempts to find further small cells. In some embodiments, mobile 110 is configured to decrease the frequency of attempts to find further small cells if mobile 110 discovers a small cell which has a signal stronger than the second threshold but weaker than the first threshold. Interruption may mean interrupting a scanning pattern that was in use prior to discovery of the discovered small cell, and taking into use another scanning pattern. In some embodiments, upon discovering a small cell with received signal strength exceeding the threshold level, mobile 110 is configured to transmit to the network a signaling message requesting the network to assign fewer measurement gaps to mobile 110. The signaling message may comprise a request or suggestion as to a new measurement gap frequency, the new measurement gap frequency being lower than the measurement gap frequency in use prior to discovery of the discovered small cell. Measurement gap frequency refers to how often measurement gaps occur. The measurement gap frequency may define the scanning pattern at least in part. In embodiments where mobile 110 is configured to stop entirely searching for further small cells, mobile 110 may express the requested measurement gap frequency as zero either explicitly or implicitly. Alternatively the mobile may signal to the network information concerning the discovered small cell, the information comprising for example a received signal strength and/or cell identity of the discovered small cell. This could form part of measurement reporting for handover purposes, for example. Mobile 110 could be configured with a new report that is triggered and sent to network when these conditions are fulfilled, for example signal strength of an inter-frequency small cell is measured exceeding a threshold, in some embodiments at least for a certain duration of time. After receiving the signaling comprising information on the signal strength exceeding the threshold level, the network may be configured to configure mobile 110 with a new inter-frequency measurement gap pattern having a longer interval between gaps.

In embodiments where mobile 110 is configured to reduce the frequency of attempts to find further small cells on small cell carriers other than the discovered small cell and its carrier, mobile 110 may be configured to observe how the signal strength of the discovered small cell develops over time, and responsive to the received signal strength declining below the second threshold, or, in some embodiments, not exceeding the first threshold for a given time interval while the received signal strength remains above the second threshold, mobile 110 may be configured to increase the frequency of attempts to find further small cells. In this case, in some embodiments mobile 110 is configured to prioritize searching carrier frequencies other than the carrier frequency of the discovered small cell. Mobile 110 may in these embodiments be configured to request more measurement gaps from the network responsive to observing the received signal strength from the discovered small cell declining below the second threshold or not exceeding the first threshold for a given time interval while the received signal strength is still above the second threshold.

By decreasing scanning for small cells, technical benefits are obtained since the negative effects of scanning on battery performance and radio resource utilization are reduced.

In general, there is provided an apparatus, such as for example mobile 110 or a control device such as a control apparatus or processor for inclusion in mobile 110. The apparatus comprises a transceiver configured to maintain attachment of the apparatus to a macro cell. Where the apparatus is mobile 110, the transceiver may be a radio transceiver maintaining attachment to a macro cell by transmitting to, and receiving from, the macro cell signaling messages over a radio interface. Where the apparatus is a control device for inclusion in mobile 110, the transceiver may be an input/output arrangement such as a serial port pin or pins, which maintain attachment to a macro cell by directing a radio transceiver comprised in a mobile 110 to exchange signaling messages with the macro cell. Attachment may be controlled by a state machine which keeps the apparatus in states, such as an attached state. Examples of attached states include active and idle states, for example. The state machine may be maintained in a control device, for example. The apparatus further comprises at least one processing core, which may be comprised in the apparatus in a control device, for example, as discussed hereinbelow in connection with FIG. 2. The at least one processing core may be configured to direct searching for small cells during a time when the apparatus is attached to the macro cell.

Directing searching for small cells may comprise directing a radio transceiver of mobile 110 to scan for energy on at least one carrier frequency, and analyzing in the control device reception results sent from the radio transceiver to the control device.

The at least one processing core may be configured to, responsive to detecting a first small cell with a received signal characteristic exceeding a first threshold, cause searching for further small cells other than the first small cell to be interrupted. Information defining the first threshold may be stored in a memory. Where the apparatus is a control device for inclusion in mobile 110, the information may be stored in memory comprised in the control device, or alternatively the control device may be configured to access the information defining the first threshold, the information being stored in a memory comprised in mobile 110 externally to the control device. Overall, information defining thresholds may be obtained from broadcast signaling of a serving cell or it may be pre-configured in mobile 100 or smart card inserted into mobile 110. The level of the first threshold, or thresholds, may be application dependent based on quality of service requirements of an application. Causing to be interrupted may comprise directing the apparatus to interrupt searching internally in the apparatus, and/or causing to be interrupted may comprise causing a signaling message to be transmitted from the apparatus to a network, to trigger the network to provide a different scanning pattern in response.

Interrupting may comprise discontinuing, or alternatively interrupting may comprise interrupting a first scanning pattern and replacing it with new scanning pattern. The new scanning pattern may be associated with searching less often than under the first scanning pattern.

The apparatus is configured to communicate with and attach to cells comprised in a heterogeneous network. In detail, the macro cell and small cells are comprised in a heterogeneous network. The apparatus may be configured to determine based on received signaling messages, such as broadcast signaling messages, whether a cell is comprised in a heterogeneous network the apparatus is configured to access.

The at least one processing core may be configured to maintain attachment to the macro cell after detecting the first small cell. The at least one processing core can thus continue directing communicating with the macro cell, potentially for a long time, after detecting the first small cell and only switch attachment from the macro cell to the first small cell responsive to a change in connection requirements of the apparatus. In other words, the at least one processing core may be configured to not switch attachment to the first small cell responsive to detecting the first small cell, and switch attachment only responsive to a change in connection requirements. In a sense, knowledge of an accessible first small cell can be kept in reserve for future needs.

The at least one processing core may be configured to observe the temporal development of the received signal characteristic, and responsive to observing that it declines below a predetermined second threshold after having first exceeded the first threshold, resume searching for the further small cells. Alternatively, the at least one processing core may be configured to resume searching for further small cells responsive to determining that the received signal characteristic declines below the first threshold, while remaining above the second threshold, and remains in the space between the first threshold and the second threshold for at least a predetermined time interval. Resuming in this context may refer to re-starting a stopped search, or increasing a reduced frequency of attempts to find further small cells.

The received signal characteristic may correspond to a received signal power level. A received signal power level, and thresholds it is compared to, may be expressed in terms of a received signal power at a radio transceiver comprised in mobile 110, for example. The received signal power at the radio transceiver may be expressed in dBm units, for example. In some embodiments, the first threshold corresponds to a higher received signal power level than the second threshold. Further examples of ways to express the received signal characteristic include reference signal received power, RSRP, and reference signal received quality, RSRQ.

In some embodiments, the received signal characteristic corresponds to a relative measure of a quality of a received signal, for example a signal to interference and noise ratio, SINR, where a desired signal strength, for example a reference signal strength from the target cell, is compared to an interference power received on the same radio resources.

In some embodiments, the threshold for received signal quality may be at least partly based on the observation that if a signal to interference and noise ratio, SINR, is above 0 dB, then the detected cell is the strongest active cell on the carrier. If the mobile has discovered a small cell having SINR over 0 dB, and possibly some offset, it can stop searching, or scanning, that frequency, but may continue searching other frequencies potentially having small cells if the small cell that was discovered is not sufficiently strong, for example the associated signal characteristic does not exceed the first threshold for interrupting searching of small cells.

In some embodiments, where the mobile finds a small cell that is below the first threshold, thus not strong enough to interrupt searching, but above the second threshold, and the discovered cell is the strongest active cell on the carrier, for example with SINR exceeding 0 dB, the mobile may be configured to interrupt searching for other cells on that carrier, because the mobile assumes the best cell on the carrier has been discovered. The mobile may continue measuring the discovered small cell on the carrier to monitor for changes in its received signal characteristic. This may allow for saving power, since measuring one cell at known times with a regular periodicity may require less activity and consume less power than searching for a synchronization signal, or beacon signal, of an unknown cell on the carrier, which may require searching at several possible timings of synchronization signal, or beacon signal.

Alternatively to a received signal power level alone, the received signal characteristic may correspond to a received signal power level in combination with a secondary characteristic relating to the first small cell. Examples of secondary characteristics relating to the first small cell include a cell size, a cell access mode, an operating bandwidth, an operating frequency, a type of spectrum the cell operates on, a backhaul capacity, radio access technology of the cell, a security capability, a datarate, a cell identity, a load status and an ability to support a specific service, feature or capability. Examples of cell access mode include open cell, closed subscriber group cell and hybrid cell. Examples of types of spectrum include licensed, unlicensed and license exempt. Examples of capabilities include multiple input multiple output communication, multiantenna communication and support for a specific RAT version. The secondary characteristics may be applied together with the received signal power level in various mathematical ways, for example a threshold level for the the received signal power level may depend on the secondary characteristics of the small cell. For example, a lower received signal power level may be considered acceptable, meaning that the applicable first threshold is lower, for small cells that offer an encrypted air interface. As another example, the applicable first threshold may depend on the maximum datarate offered by the small cell according to a mathematical function, so as to prioritize attachment to small cells offering higher datarates. Knowledge of secondary characteristics may be obtained in the apparatus, for example, from signals broadcast from the small cells, or from a database stored in the apparatus, which indicates which secondary characteristics apply to each small cell. The apparatus may refer to such a database using a cell identity obtained from signaling transmitted from the small cell, for example.

In some embodiments, the at least one processing core is configured to, in connection with the interrupting, transmit to the macro cell a signal requesting the network to provide fewer measurement opportunities to the apparatus, or even none at all. The base station controlling the macro cell may be competent to change the provision of measurement opportunities responsive to receiving the signal, or alternatively it may be configured to provide the request to a further network node for decision. Examples of such further nodes may include, depending on the embodiment, a base station controller, a radio network controller, switching center and a mobility management entity.

Figure 3:
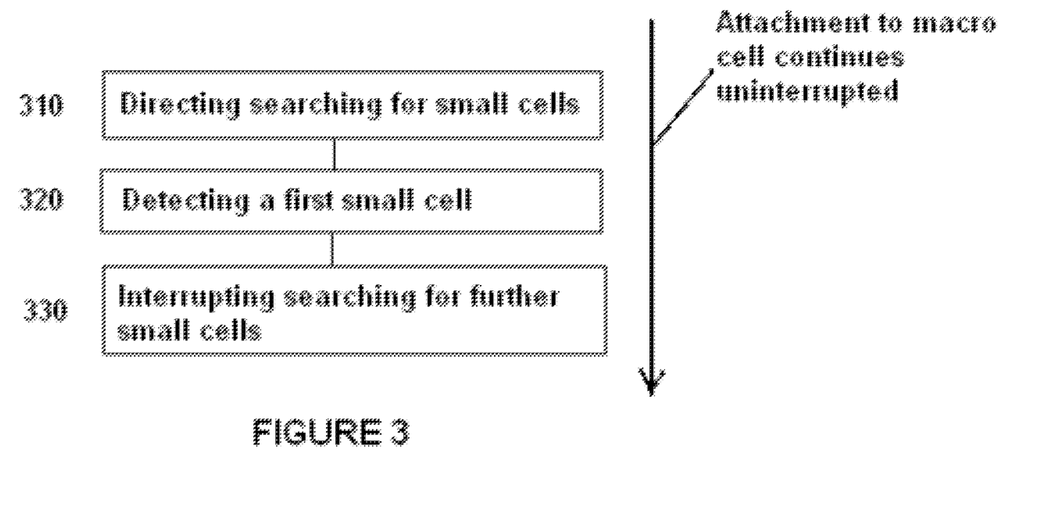
FIG. 3 is a flow diagram illustrating a method in accordance with at least some embodiments of the invention.

FIG. 3 is a flow diagram illustrating a method in accordance with at least some embodiments of the invention. In phase 310, an apparatus that is attached to a macro cell, for example attached in an active or an idle mode, searches for small cells available within active communication distance. Searching may comprise scanning as described above. In phase 320, responsive to detecting a small cell with a received signal characteristic exceeding a predetermined first threshold, the apparatus may be configured to interrupt the search for further small cells. Interrupting the search may comprise either stopping searching or modifying a search strategy to a less active search strategy. In connection with the interrupting, the apparatus may be configured to transmit a signaling message to the macro cell informing the macro cell of the interruption. The signaling message may be a request for fewer measurement gaps to be provided to the apparatus. Subsequent to the interruption, the apparatus may continue to be attached to the macro cell and continue uninterrupted any communication sessions it has via the macro cell. The apparatus may be configured to subsequently transfer attachment to the detected small cell in response to a separate triggering event, such as for example a determination that a communication type is requested, that is configured to, where possible, be offloaded from the macro cell to a small cell. A communication of a type configured to be offloaded may be requested, for example, by a user of the apparatus. The apparatus may be configured with a list of traffic types for offloading. The apparatus may store the list in an internal memory. The list may be provided in connection with a subscription, or it may be dynamically be configured into the apparatus from a macro cell, for example.

Figure 4:
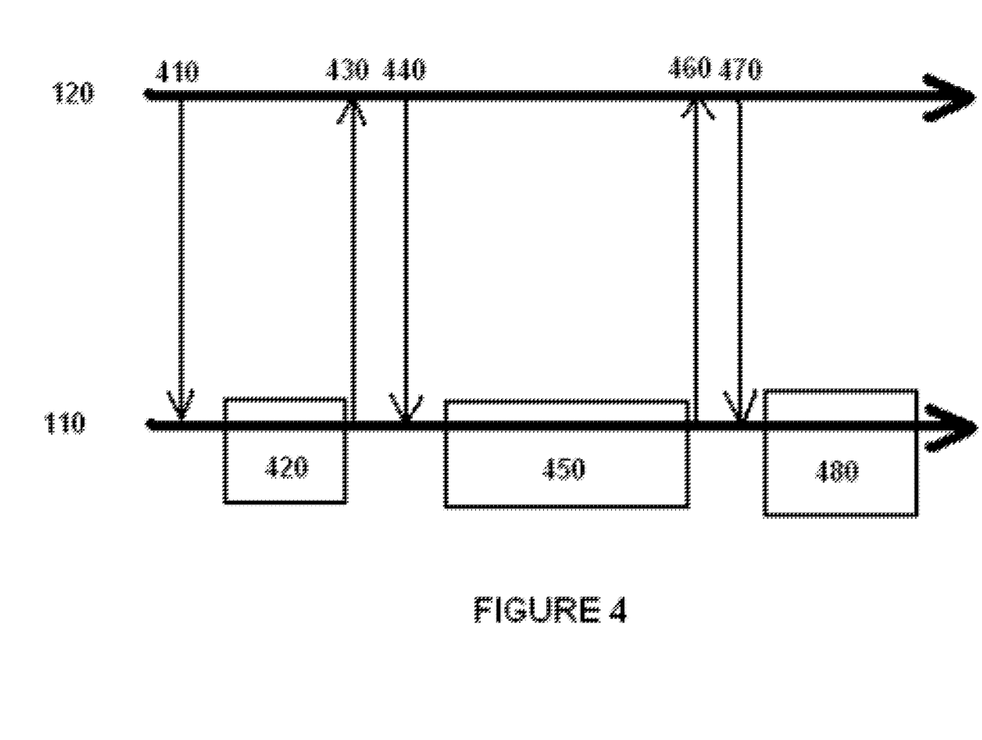
FIG. 4 is a signaling diagram illustrating communications in an embodiment of the invention.

FIG. 4 is a signaling diagram illustrating communications in an embodiment of the invention. The upper horizontal arrow corresponds to a base station controlling a macro cell, such as for example base station 120. The lower horizontal arrow corresponds to mobile 110. Time increases from left to right. In phase 410, the base station transmits to the mobile an allocation of measurement gaps to allow the mobile to search for small cells within the cell coverage area of a cell controlled by the base station. The allocation may be transmitted in a control channel, for example. In phase 420, the mobile searches for contactable small cells, for example by scanning, during the allocated measurement gaps. Phase 420 ends when the mobile detects a first small cell with a signal characteristic that exceeds a first threshold in the mobile. In phase 430, which occurs responsive the end of phase 420, the mobile indicates to the base station that the measurement gap allocation should be ended or reduced, as a usable small cell has been identified by the mobile. In some embodiments phase 430 is absent and the mobile reduces or interrupts searching autonomously. The base station may reply by transmitting a reduced measurement gap allocation, phase 440. Where phase 430 is absent, also phase 440 may be absent. In phase 450, the mobile may observe the development of the signal characteristic of the usable small cell while continuing communications normally with the base station. In some embodiments, the mobile doesn't search for further small cells during phase 450. In other embodiments, the mobile searches for further small cells, less often than in phase 420, using the reduced measurement gap allocation. In phase 460, the mobile may detect that the signal characteristic of the usable small cell declines below a second threshold, which may equal or otherwise the first threshold, and may responsively transmit to the base station a request for more measurement gaps in order to resume normal searching for further small cells. In phase 470 the base station may inform the mobile of grant of the requested new measurement gaps, responsive to which the mobile may begin searching for small cells using the new measurement gaps, phase 480.

Should the mobile encounter a trigger for attaching to a small cell during phase 450, it can initiate or trigger handover from the macro cell to the detected small cell. In some embodiments, it is the network that initiates the handover responsive to detecting that there is a communication incoming to the mobile, which is of a type that is configured for offloading to a small cell. An example may be an incoming video call in a network where video calls are preferentially connected through small cells. Another example may be a download of a large file where the user would benefit from a high data rate offered by the small cell. The network observes the large amount of data buffering, for example at the base station, for the mobile and triggers a handover to the small cell to speed up the file transfer.

Figure 2:
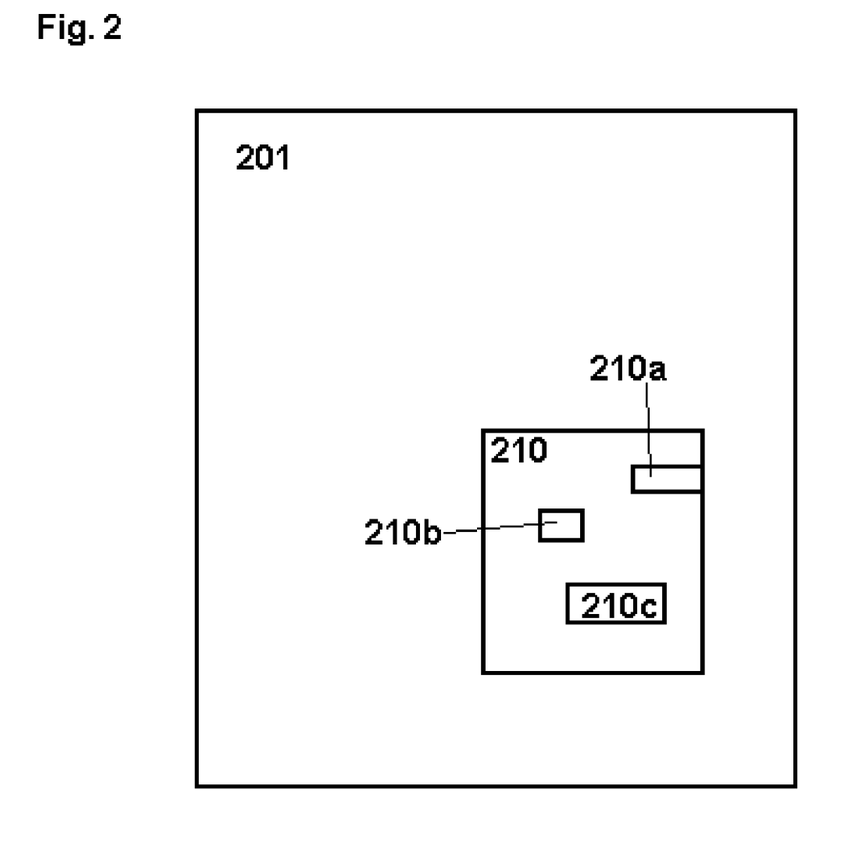
FIG. 2 illustrates an example apparatus 201 capable of supporting at least some embodiments of the present invention.

FIG. 2 illustrates an example apparatus 201 capable of supporting at least some embodiments of the present invention. The apparatus may correspond to mobile 110, for example. The apparatus is a physically tangible object, for example a mobile telephone, personal digital assistant, data dongle or a similar device. The apparatus may comprise a control apparatus 210, for example a microprocessor, digital signal processing, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example information defining at least one threshold level. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as hardware or a combination of software and hardware. The logic circuitry 210c may comprise at least one processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus, or control device, 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

Without in any way limiting the scope, interpretation, or application of the claims appearing below, a technical effect of one or more of the example embodiments disclosed herein is that by reducing searching for small cells, the impact of searching on mobile battery performance is reduced. Another technical effect of one or more of the example embodiments disclosed herein is that by reducing searching for small cells, radio resources are freed up and they can be used in a more continual and efficient manner.

Embodiments of the present invention may be implemented in software, hardware, application logic or a combination of software, hardware and application logic. The software, application logic and/or hardware may reside on memory 210b, the control apparatus 210 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    a transceiver configured to maintain attachment of the apparatus to a cellular macro cell;
    at least one processing core configured to direct searching for small cells during the attachment of the apparatus to the macro cell;
    the at least one processing core being configured to, responsive to detecting a first small cell with a received signal characteristic exceeding a predetermined first threshold, cause searching for further small cells other than the first small cell to be interrupted,
    wherein the apparatus is configured to communicate with and attach to cells comprised in a heterogeneous network, and the macro cell, the first small cell and the further small cells are heterogeneous network cells, and
    wherein the at least one processing core is configured to maintain the attachment to the macro cell after detecting the first small cell and only switch the attachment from the macro cell to the first small cell responsive to a change in connection requirements of the apparatus.

2. The apparatus according to claim 1, wherein the at least one processing core is configured to resume searching for further small cells responsive to detecting that the received signal characteristic of the first small cell either declines below a predetermined second threshold or does not exceed the predetermined first threshold for a predetermined time interval.

3. The apparatus according to claim 1, wherein the received signal characteristic is a received signal power level.

4. The apparatus according to claim 1, wherein the received signal characteristic comprises a received signal power level and a secondary characteristic relating to the first small cell.

5. The apparatus according to claim 4, wherein the secondary characteristic comprises an indication of at least one of: a security capability, a datarate, a cell identity, a load status and an ability to support a specific service.

6. The apparatus according to claim 1, wherein the at least one processing core is configured to cause the transceiver, in connection with the interrupting, to transmit toward the macro cell a signal requesting the macro cell to provide fewer measurement opportunities to the apparatus.

7. The apparatus according to claim 1, wherein the apparatus comprises a mobile communication device, the apparatus further comprising an antenna coupled to the transceiver and configured to provide signals to the at least one processing core.

8. A method, comprising:
    maintaining attachment of an apparatus to a cellular macro cell;
    directing searching for small cells during the attachment of the apparatus to the macro cell;
    responsive to detecting a first small cell with a received signal characteristic exceeding a predetermined first threshold, causing searching for further small cells other than the first small cell to be interrupted, and
    maintaining the attachment to the macro cell after detecting the first small cell and only switching the attachment from the macro cell to the first small cell responsive to a change in connection requirements of the apparatus,
    wherein the apparatus is configured to communicate with and attach to cells comprised in a heterogeneous network, and the macro cell, the first small cell and the further small cells are heterogeneous network cells.

9. The method according to claim 8, further comprising resuming searching for further small cells responsive to detecting that the received signal characteristic of the first small cell either declines below a predetermined second threshold or does not exceed the predetermined first threshold for a predetermined time interval.

10. The method according to claim 8, wherein the received signal characteristic is a received signal power level.

11. The method according to claim 8, wherein the received signal characteristic comprises a received signal power level and a secondary characteristic relating to the first small cell.

12. The method according to claim 11, wherein the secondary characteristic comprises an indication of at least one of: a security capability, a datarate, a cell identity, a load status and an ability to support a specific service.

13. The method according to claim 8, further comprising causing the apparatus, in connection with the interrupting, to transmit toward the macro cell a signal requesting the macro cell to provide fewer measurement opportunities to the apparatus.

14. A non-transitory computer-readable medium encoded with instructions that, when executed by a computer, perform:
    maintaining attachment of an apparatus to a cellular macro cell;
    directing searching for small cells during the attachment of the apparatus to the macro cell;
    responsive to detecting a first small cell with a received signal characteristic exceeding a predetermined first threshold, causing searching for further small cells other than the first small cell to be interrupted, and
    maintaining the attachment to the macro cell after detecting the first small cell and only switching the attachment from the macro cell to the first small cell responsive to a change in connection requirements of the apparatus,
    wherein the apparatus is configured to communicate with and attach to cells comprised in a heterogeneous network, and the macro cell, the first small cell and the further small cells are heterogeneous network cells.

* * * * *